United States Patent [19]

DeWitt et al.

[11] 4,418,179

[45] Nov. 29, 1983

[54] IMPACT MODIFIED POLYCYCLOOLEFINS

[75] Inventors: Elmer J. DeWitt, Cuyahoga Falls; Robert J. Minchak, Parma Heights; Biing-Lin Lee, Broadview Heights; George M. Benedikt, Lakewood, all of Ohio

[73] Assignee: The B. F. Goodrich Company, Akron, Ohio

[21] Appl. No.: 427,369

[22] Filed: Sep. 29, 1982

[51] Int. Cl.³ .................. C08L 23/06; C08L 23/12; C08L 45/00
[52] U.S. Cl. .................. 525/249; 525/276; 525/289; 525/290
[58] Field of Search ............... 525/289, 249, 276, 290

[56] References Cited

U.S. PATENT DOCUMENTS 4,005,156 1/1977 Schmeriing ................. 525/289
4,140,731 2/1979 Nakamura et al. ........... 525/289

*Primary Examiner*—Carman J. Seccuro
*Attorney, Agent, or Firm*—George A. Kap

[57] ABSTRACT

Impact modified polycycloolefin is made by ring opening bulk polymerization of at least one monomer containing at least one norbornene group in the presence of an organoammonium molybdate or tungstate catalyst and an alkoxyalkylaluminum halide cocatalyst as well as a sufficient amount of an impact modifier selected from polyolefin powders and polyvinylidene fluoride powders.

10 Claims, No Drawings

IMPACT MODIFIED POLYCYCLOOLEFINS

BACKGROUND OF THE INVENTION

Polycycloolefins can be prepared by solution ring opening polymerization of at least one cycloolefin that contains at least one norbornene group. The polymerization reaction yields a honey-like cement containing about 15% solids that comprises polymer solids dissolved in a solvent. The polymer is then precipitated and separated from the cement in a known manner.

The resulting polymer, that can be a homopolymer, copolymer, terpolymer, etc., is brittle and requires modification to make it suitable for commercial applications. For instance, notched Izod value of unmodified polymethyltetracyclodecedene was 44 J/M, which reflects the brittle character of the polymer which for many applications is an unacceptably low impact strength.

It is well known to use rubbery materials as impact modifiers in polymer systems. An attempt was initially made to use a conventional impact modifier for polycycloolefins, however, it proved dissappointing. Only a slight improvement in toughness to 85 J/M was observed when 5 parts of a hydrogenated block copolymer of styrene-butadiene-styrene was dissolved in 5-methyltetracyclododecene and polymerized in bulk in the usual manner with a ring opening catalyst. Other conventional impact modifiers that were also tried were acrylonitrile-butadiene-styrene and methyl methacrylate-styrene-butadiene rubbery materials. These impact modifiers in polymethyltetracyclododecene resulted in negligible improvement in toughness to about 50 J/M.

The use of crystalline polyolefin plastics as impact modifiers, such as polyethylene, pursuant to the invention disclosed herein, is totally unexpected. Although crystalline polyolefin plastics have been used as lubricants in the past, this fact cannot be presumed to suggest their use as impact modifiers in polycycloolefins or any other polymer system. Furthermore, due to their non-rubbery nature, their use as impact modifiers is totally unexpected.

Crystalline polyolefin plastics, especially polyethylene, have been used in the past as lubricants in polyvinyl chloride and other systems. In polymer systems, lubricants or slip agents prevent sticking of the polymer mass to the mill during milling, help to keep the polymer mass from breaking up, and generally facilitate formation of a smooth band on the mill. Amount of polyethylene lubricant used in polymer systems is very small, on the order of a fraction of one part per 100 parts of the polymer on weight basis. If more than about 1 part of polyethylene lubricant is used, it becomes increasingly difficult to disperse. To demonstrate more specifically the amount of polyethylene used as a lubricant, it is pointed out that in polyvinyl chloride, and in chlorinated polyvinyl chloride, only about 0.1 to 0.2 parts thereof is generally used, with a maximum of about 1 part.

SUMMARY OF THE INVENTION

This invention pertains to impact modification of polycycloolefins that are prepared by ring opening bulk polymerization of at least one monomer containing at least one norbornene group in presence of a polyolefin powder. At least a doubling of impact properties is obtained by the use of polyolefins or polyvinylidene fluoride of small particle size.

DETAILED DESCRIPTION OF THE INVENTION

Contrary to expectations of those skilled in the art, it was unexpectedly discovered that crystalline polyolefin plastics or polyvinylidene fluoride can be used to improve impact properties of polycycloolefins. The class of polyolefins contemplated herein includes lower polyolefins such as polyethylene and polypropylene. This includes from low density to high density polyolefins such as polyethylene, linear low density polyethylene, and low and high and ultra high molecular weight polyolefins. Low density polyethylene is characterized by a density of about 0.910 to 0.925, high density polyethylene has a density of about 0.941 to 0.965, medium density polyethylene has an intermediate density of about 0.926 to 0.940. The polyolefins referred to herein contain substantial crystallinity. In reference to polyethylene and polypropylene specifically, these materials contain substantial crystallinity and the higher the density thereof the more crystalline they are.

Suitable impact modifiers are solid and in a particulate form at ambient conditions. Preferred impact modifiers are powdered and have very small particle size. Generally speaking, powder is defined in terms of particle size that is, on the average, smaller than about 1 millimeter (1000 microns), more preferably smaller than about one-half millimeter and even smaller than 0.1 millimeter, such as about 10 to 50 microns.

A specific example of a low density polyethylene suitable herein in Microthene 510 made by USI that has a density of 0.924 g/cc, melt index of about 5, and average particle size of 8.6 to 30.7 microns. Arco's polyethylene SDP 1113 falls into the same category of average particle size of 125 to 250 microns, its density is high at 0.958 and it has a melt index of 16 to 18. Arco's polyethylene SDP 1114 has a very small average particle size of 50 to 60 microns, density of 0.95, and melt index of 0.1 to 0.2. Hercules 1900 is an ultra high molecular weight polyethylene that has a density of 0.95, melt index of 0.0, and an average particle size of about 420 microns. Microthene 510 (L-38) is a polyethylene powder that has a very small average particle size of 24 microns, a low density of 0.924 g/cc, and a melt index of 5.

Based on experimental data, impact modification of polycycloolefins herein will require about 5 parts of an impact modifier per 100 parts of monomer, and greater. In a preferred embodiment, amount of impact modifier will be in the range of about 10 to 20 parts. Generally speaking, amount of impact modifier used should be sufficient to obtain at least a doubling, preferably at least a tripling of Izod impact strength, in terms of J/M, compared to unmodified or neat polycycloolefins.

Impact modified polycycloolefins are prepared by bulk polymerization. The experimental procedure involves the use of a bottle fitted with a nitrogen line so that the mixing of the components can be carried out under a blanket of nitrogen. To the bottle are added, with mixing or shaking the monomer or a mixture thereof, an antioxidant and an impact modifier in powder form. This is followed by addition of an alcohol or another source of hydroxyl in the monomer; an alkylaluminum halide also dissolved in the monomer; and an alkyl ammonium molybdate or tungstate compound catalyst, also in the monomer. All these ingredients are added to the bottle while the bottle is flushed with nitrogen. After shaking the bottle to mix the ingredients, the vacuum is applied to remove dissolved gases in the bottle and then, vacuum is broken with nitrogen and bottle contents are poured into a preheated mold. When the monomer mix is introduced into the preheated mold, polymerization is thermally initiated and is completed very quickly. Upon opening of the mold, a hard, plastic object is recovered.

The alcohol and the alkylaluminum halide react in situ to form an alkoxyalkylaluminum halide cocatalyst of the following formula:

$$(RO)_a R^1{}_b Al X_c$$

where R is an alkyl radical containing about 1 to 18 carbon atoms, preferably 2 to 4; $R^1$ is an alkyl radical containing 1 to 12 carbon atoms, preferably 2 to 4; X is a halogen selected from chlorine, iodine, bromine and fluorine, preferably chlorine; "a" is a number indicating equivalents of the alkoxy moiety RO— and can vary from a minimum of about $\frac{1}{2}$ to a maximum of about $2\frac{1}{2}$, preferably from about 1 to about $1\frac{3}{4}$; "b" indicates the number of atoms of alkyl group $R^1$ and can vary from a minimum of about $\frac{1}{4}$ to a maximum of about 2, preferably from about $\frac{1}{2}$ to about 1; and "c" indicates the number of halogen atoms X and can vary from a minimum of about $\frac{1}{2}$ to a maximum of about 2, preferably from about $\frac{3}{4}$ to about $1\frac{1}{4}$. In all of the cocatalysts defined by the ranges herein, one atom of aluminum is combined with the indicated equivalents of the other components.

It has been discovered that the cocatalyst, to be useful in a bulk polymerization system described herein, must contain at least some halogen X, some alkoxy group RO, and some alkyl group R', along with aluminum. When the cocatalyst in the system is a trialkylaluminum ($R'_3Al$), the polymerization product is a viscous cement and conversion of only up to about 30% is achieved even at temperature as high as 140° C. With aluminum trihalide ($AlCl_3$) or trialkoxyaluminum (($RO)_3Al$) as cocatalysts in the system, very little or no polymerization takes place. Same is true of dialkoxyaluminum halide, since it does not contain the alkyl group.

The alkoxyalkylaluminum cocatalyst is obtained by the modification of an alkylaluminum halide. This is achieved by introducing an alkoxy group therein either with oxygen, an alcohol, a phenol, or in other ways. When using an alcohol, such as ethanol or propanol, the alcohol can be prereacted with the alkylaluminum halide before adding the cocatalyst to the system. Suitable alcohol is one which yields an alkoxy alkylaluminum halide cocatalyst that is soluble in the cycloolefin monomer. Such a reaction is conducted in absence of water by providing a blanket of nitrogen and mixing the two ingredients. The reaction is rapid and results in evolution of volatile hydrocarbons, such as ethane if diethylaluminum is used. The reaction goes essentially to 100% completion.

Instead of prereacting the alcohol with the alkylaluminum halide, the alcohol and the alkylaluminum halide can be reacted in situ. The alkoxy groups are provided by the alcohols, of course, however, alkoxy groups can be supplied by other hydroxyl containing materials that come in contact with the alkylaluminum halide before or during polymerization. For instance, any ingredient in the formulation that contains hydroxyl groups can provide such groups for reaction with the alkylaluminum halide to inhibit its reducing potency. Examples of such materials are certain fillers and phenolic stabilizers that have available hydroxyl groups for reaction with the alkylaluminum halide. In such a case, when a suitable hydroxyl-containing filler is mixed with the ingredients of a formulation, including the alkylaluminum halide, the hydroxyl groups on the filler react with the alkylaluminum halide whereby an alkoxy group becomes attached to aluminum. The alkoxy group in the alkylaluminum halide functions to inhibit reducing power of the alkylaluminum halide by replacing some of the alkyl groups on the aluminum thus making it possible to react the cyclic olefins via bulk polymerization. It should be understood that the use of excess oxygen or alcohol or a hydroxyl containing material over the stoichiometric amount of alkyl groups present in alkylaluminum halide should be avoided in order not to render the aluminum compound ineffective as a reducing agent.

Suitable catalysts are organoammonium molbydates and tungstates that are selected from those defined as follows:

$$[R_4N]_{(2y-6x)} M_x O_y$$

$$[R^1{}_3NH]_{(2y-6x)} M_x O_y$$

where O represents oxygen; M represents either molybdenum or tungsten; x and y represent the number of M and O atoms in the molecule based on the valence of +6 for molybdenum, +6 for tungsten, and −2 for oxygen; and the R and $R^1$ radicals can be same or different and are selected from hydrogen, alkyl, and alkylene groups each containing from 1 to 20 carbon atoms, and cycloaliphatic groups each containing from 5 to 16 carbon atoms. All of the R and $R^1$ radicals cannot be hydrogens or be small in the number of carbon atoms since such a condition will render the molecule essentially insoluble in hydrocarbons and most organic solvents. In a preferred embodiment, the R radicals are selected from alkyl groups each containing 1 to 18 carbon atoms wherein the sum of carbon atoms on all the R radicals is from 20 to 72, more preferably from 25 to 48. In a preferred embodiment, the $R^1$ radicals are selected from alkyl groups each containing from 1 to 18 carbon atoms wherein the sum of carbon atoms on all of the $R^1$ radicals is from 15 to 54, more preferably from 21 to 42.

It has been found that in the case of the organoammonium molybdates and tungstates represented by the formula $$[R_4N]_{(2y-6x)} M_x O_y$$

where all R radicals are the same, each can contain from 4 to 18 carbon atoms. Where three R radicals are the same, each containing from 7 to 18 carbon atoms, the remaining R can contain from 1 to 18 carbon atoms. Where three R radicals are the same, each containing 4 to 6 carbon atoms, the remaining R radical can contain 4 to 18 carbon atoms. In the case where two of the four R radicals are the same, the two same R radicals can each contain from 12 to 18 carbon atoms and the remaining two R radicals can contain from 1 to 18 carbon atoms. With respect to each other, the remaining two R radicals can be same or different as long as each contains 1 to 18 carbon atoms. Where all R radicals are different, the sum thereof can be in the range of 20 to 72 carbon atoms.

the pot life as well as many other variables. If a system is designed to give a pot life of about 8 hours, it will take longer to carry out polymerization at the same mold temperature compared to a system designed for a shorter pot life. Polymerization time can be reduced by raising the mold temperature, however, mold temperature should be kept above 50° C. but below about 200° C., preferably in the range of 90° to 130° C.

Cycle time for reaction injection molding should be less than about 5 minutes, preferably less than about 2 minutes. Cycle time includes mold filling, monomer heat-up, polymerization, cooling and demolding. Mold filling requires about 10 to 30 seconds. Assuming a mold temperature of 120° C., the monomer will reach a temperature where polymerization starts in about 45 seconds. Most of the polymerization occurs during the polymerization exotherm of about 5–10 seconds, which reaches about 230° C., following which the molded part begins to cool down to mold temperature. When the part is sufficiently cooled, which takes about 1–2 minutes, the mold is opened and the part removed.

Reaction injection molding (RIM), a form of bulk polymerization, is a low pressure, one-step or one-shot injection of liquid components into a closed preheated mold where rapid polymerization occurs resulting in a molded plastic product. In a RIM process, viscosity of the materials fed to a mold is about 10 to 10,000 cps, preferably about 1500 cps, at injection temperatures varying from room temperature for urethanes to about 150° C. for lactams. Mold temperatures in a RIM process are in the range of about 100° to 200° C. and pressures in the mold are generally in the range of about 50 to 150 psi. At least one component in the RIM formulation is a monomer that is polymerized to a polymer in the mold. The main distinction between injection molding and RIM resides in the fact that in RIM, a chemical reaction takes place in the mold to transform a monomer to a polymeric state. For practical purposes, the chemical reaction must take place rapidly in less than about 2 minutes, in a preferred embodiment.

The invention described herein is illustrated by the following example in terms of specific materials and operaring conditions employed.

EXAMPLE 1

This example demonstrates preparation of impact modified methyltetracyclododecene (MTD) by ring opening bulk polymerization employing a metathesis catalyst. The materials used herein included Ethyl 330 antioxidant, a 0.5 molar solution of 1-propanol in MTD, a 0.5 molar solution of diethylaluminum chloride (DEAC) in MTD, and a 0.1 molar tri(tridecylammonium)molybdate (TTAM) catalyst.

Preparation of an impact modified polycycloolefin involved the addition at room temperature of 1.2 g of the Ethyl 330 antioxidant to a 7-oz. bottle flushed with nitrogen, followed by 80 g of MTD. The bottle was then placed in an oven heated to 100° C. for about 3 hours to dissolve the antioxidant. This is an optional step and can be omitted. The bottle was then removed from the oven and cooled to room temperature while under a blanket of nitrogen. At this point, the following were added: impact modifier in amount specified below, 7.4 ml of the propanol solution, 4.6 ml of diethylaluminum chloride and 5.8 ml of tri(tridodecyl)ammonium molybdate catalyst solutions. The catalyst and the cocatalyst were added with a syringe. After addition of each of the above ingredients, the bottle was shaken to thoroughly mix the contents thereof. The molybdate catalyst employed is believed to have the following formula and the proper chemical term thereof is tetrakis-tri(tridecyl) ammonium molybdate:

$$[H(C_{13}H_{27})N]_4Mo_8O_{26}$$

The cocatalyst herein was formed in several seconds in situ by the reaction of the alkylaluminum halide with the alcohol that yielded propoxyethylaluminum chloride that is believed to have the following formula:

$$(C_3H_7O)_{1.6}(C_2H_5)_{0.4}AlCl$$

The molar ratio of n-propanol to aluminum was 1.6/1, the molar ratio of MTD to aluminum was 200/1, and the molar ratio of aluminum to molybdenum was 4/1.

After thorough mixing, vacuum was applied to the contents of the bottle while shaking it to remove dissolved gases following which, the vacuum was broken with nitrogen and the contents of the bottle were added to a 2-plate mold preheated to 120° C. and flushed with nitrogen. There was no evidence of polymerization at room temperature.

When the monomer mix was deposited in the mold, it took only 2 to 3 minutes for polymerization to take place. As already described, temperature in the mold initially dropped to about 50° to 60° C. when the monomer mix was introduced into the mold and thereafter, within a span of less than 2 minutes, it rose gradually to 80° to 90° C. in one-half minute, then rapidly to about 230° C. This sharp temperature rise indicated the polymerization exotherm following thermal initiation. The reaction temperature thereafter quickly dropped to the mold temperature. The solid, molded object started to cool and was extracted by opening the mold. Plaque sample was obtained that measured $4'' \times 5'' \times \frac{1}{4}''$.

A number of experiments were run and samples of molded plaques were obtained with the addition of crystalline polyethylene and polyvinylidene fluoride plastic impact modifiers that were subjected to the Notched Izod impact test, ASTM No. D-256. Amount and type of polyethylene and the impact test data is summarized in Table I, below:

TABLE I

| Exp. No. | Polyolefin | Polyolefin phm | Notched Izod, J/M |
|---|---|---|---|
| 1 | — | — | 44 |
| 2 | Kraton 1650G | 5 | 85 |
| 3 | Microthene 510 (PE) | 5 | 66 |
| 4 | Microthene 510 (PE) | 10 | 157 |
| 5 | Microthene 510 (PE) | 15 | 110 |
| 6 | SDP-1113 (PE) | 10 | 146 |
| 7 | SDP-1114 (PE) | 10 | 139 |
| 8 | SDP-1115 (PE) | 10 | 140 |
| 9 | Amoco 41-305 (PE) | 10 | 50 |
| 10 | Hercules 1900 (PE) | 10 | 52 |
| 11 | PVF$_2$ | 15 | 126 |

In the above table, Kraton 1650G is hydrogenated block copolymer of styrene-butadiene-styrene that is a known impact modifier and PVF$_2$ is polyvinylidene fluoride that is a high melting, crystalline polymer. Data for the other impact modifiers is set forth below:

| | Density g/cc | Melt Index | Particle Size, microns |
|---|---|---|---|
| Arco SDP 1113 | 0.958 | 16–18 | 125–250 |

Similar remarks apply to organoammonium molybdates and tungstates that are defined by the following formulas:

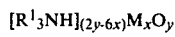

The $R^1$ radicals cannot be too small if the molecule is to be soluble in a hydrocarbon reaction solvent and/or a norbornene-type monomer. Where all $R^1$ radicals are the same in the above formula, each can contain from 5 to 18 carbon atoms. Where two $R^1$ radicals are the same or all the $R^1$ radicals are different, each can contain from 1 to 18 carbon atoms and the sum thereof can be in the range of 15 to 72 carbon atoms. Included herein are also compounds wherein $R^1$ radical is hydrogen in which case, the remaining two $R^1$ radicals can each contain 12 carbon atoms and greater, i.e., 12 to 18 carbon atoms.

Specific examples of suitable organoammonium molybdates and tungstates described herein include tridodecylammonium molybdates and tungstates, methyltricaprylammonium molybdates and tungstates, tri(tridecyl) ammonium molybdates and tungstates, and trioctylammonium molybdates and tungstates.

The organoammonium molybdate or tungstate or a mixture thereof, is employed at a level of about 0.01 to 50 millimoles molybdenum or tungsten per mole of total monomer, preferably 0.1 to 10 millimoles. The molar ratio of the alkylaluminum halide to the organoammonium molybdate and/or tungstate is not critical and can be in the range of about 200:1 or more to 1:10, preferably from 10:1 to 2:1 of aluminum to molybdenum or tungsten.

The norbornene-type monomers or cycloolefins that can be polymerized in bulk, in accordance with the process described herein, are characterized by the presence of at least one of the following norbornene group, identified by formula I, that can be substituted or unsubstituted:

(I)

Pursuant to this definition, suitable norbornene-type monomers include substituted and unsubstituted norbornenes, dicyclopentadienes, dihydrodicyclopentadienes, trimers of tricyclopentadiene, and tetracyclododecenes. Preferred monomers of the norbornene-type are those defined by the following formulas II and III:

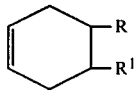 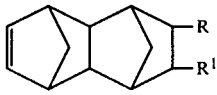

(II)  (III)

where R and $R^1$ are independently selected from hydrogen, alkyl, and aryl groups of 1 to 20 carbon atoms, and saturated and unsaturated cyclic groups containing 3 to 12 carbon atoms formed by R and $R^1$ together with the two ring carbon atoms connected thereto. In a preferred embodiment, R and $R^1$ are independently selected from hydrogen and alkyl groups of 1 to 2 carbon atoms. Examples of monomers referred to herein include dicyclopentadiene, methyltetracyclododecene, 2-norbornene and other norbornene monomers such as 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, and 5-dodecyl-2-norbornene.

This invention especially contemplates preparation of homopolymers, copolymers and terpolymers of methylnorbornene, methyltetracyclododecene and dicyclopentadiene and especially homopolymers of methyltetracyclododecene and copolymers of methyltetracyclododecene and methylnorbornene. The copolymers of methyltetracyclododecene and methylnorbornene are polymerized from monomer mixtures containing from 1 to 75% by weight methylnorbornene and the copolymers contain from 1 to 75% by weight of polymerized methylnorbornene. The terpolymers are polymerized from monomer mixtures containing 1 to 75% by weight methylnorbornene and 25 to 99% by weight methyltetracyclododecene, with the remainder being dicyclopentadiene. The terpolymers contain from 1 to 75% by weight of polymerized methylnorbornene and 25 to 99% by weight polymerized methyltetrocyclododecene.

The monomer or mixture of norbornene-type monomers can contain up to about 20% by weight thereof of at least one other polymerizable monomer. Such other polymerizable monomers are preferably selected from mono- and dicycloolefins containing 4 to 12 carbon atoms, preferably 4 to 8 carbon atoms, examples of which include cyclobutene, cyclopentene, cyclopentadiene, cycloheptene, cyclooctene, 1,5-cyclooctadiene, cyclodecene, cyclododecene, cyclododecadiene, and cyclododecatriene. Also suitable are bicyclic olefins containing 7 to 16 carbon atoms and 1 to 4 double bonds, preferably 8 to 12 carbon atoms and 2 to 3 double bonds, such as norbornadiene.

At least one nonconjugated acyclic olefin can be used as a molecular weight modifier having at least one hydrogen on each double-bonded carbon atom and containing 2 to 12 carbon atoms, more preferably 3 to 8 carbon atoms. Preferably, the nonconjugated acyclic olefin is selected from 1-olefins and 2-olefins containing 3 to 8 carbon atoms such as 1-butene, 3-methyl-1-butene, 2-pentene, 4-methyl-2-pentene, and the like. Compounds not having hydrogen atoms substituted on double-bonded carbons are unreactive in this invention.

The nonconjugated acyclic olefin can be used in a molar ratio to total monomer charge of from about 0.0001 to about 1 mole per mole of the monomer charge. The nonconjugated acyclic olefin is charged directly with the monomers.

The system herein can be designed to give a pot life of at least about one-half minute at room temperature. In a preferred embodiment, the pot life is about 1 hour to about 8 hours.

Polymerization is interrelated with pot life. Generally, with respect to the system herein, the longer the pot life the longer it will take to complete polymerization at an elevated temperature. For instance, if a pot life of about one-half hour were designed for the system described herein, polymerization can be completed in as short a time as about one-half minute for a mold temperature of about 110° C., however, for a pot life of about 8 hours, polymerization may take a couple of minutes using similar reaction temperatures. Furthermore, reaction or polymerization temperature will also depend on -continued

| | Density g/cc | Melt Index | Particle Size, microns |
|---|---|---|---|
| Arco SDP 1114 | 0.95 | 26 | 30–40 |
| Arco SDP 1115 | 0.95 | 0.1–0.2 | 50–60 |
| Amoco 41-305 | 0.952 | 0.8 | 125–250 |
| Hercules 1900 | 0.95 | 0.0 | ~420 |
| Microthene 510 | 0.924 | 5 | 8.6–30.7 |

Hercules 1900 is an ultra-high molecular weight powder. The term "PE" in Table I, represents polyethylene, the units of J/M stand for joules/meter, and phm represents parts per 100 parts monomer.

As is self-evident from the data in Table I, neat polymer of MTD had notched Izod of 44 J/M and poly MTD modified with Kraton G, a known impact modifier, gave notched Izod of only 85 J/M. At levels above 5 parts of this impact modifier, viscosities became unmanageable and heat distortion temperature of the final products dropped drastically. At 10 parts of Microthene 510 polyethylene per 100 parts monomer, notched Izod more than tripled to 157 J/M and similar results were obtained with SDP-1113, 1114 and 1115 polyethylenes. For some unknown reason, Amoco 41-305 and Hercules 1900 polyethylenes gave notched Izod of only 50 and 52 J/M, respectively.

The best impact strength results were obtained with Microthene 510 polyethylene, the reason for which might reside in the particle size of this material. As shown above, Microthene 510 polyethylene powder is a low density material having particles in the range of 8.6 to 30.7 microns on an average particle size of 24 microns. Arco's SDP-1114 and 1115 are high density materials but their particle sizes are also relatively small and yet the results show notched Izod of about 140 J/M for both of these lubricants and a notched Izod of 146 J/M for SDP-1113 which has a larger particle size of 125 to 250 microns. There appears to be a correlation between notched Izod and particle size and this may explain why Hercules 1900 polyethylene lubricant gave an Izod value of only 52 J/M. It is not apparent why Amoco 41-305 lubricant performed so poorly since its particle size is 125 to 250 microns, which is the same as that of SDP-1113.

We claim:

1. Process for preparing impact modified polycycloolefins comprising feeding a liquid mix into a mold maintained at an elevated temperature whereby ring opening polymerization in bulk of said liquid mix is thermally initiated, and extracting molded impact modified polycycloolefin from the mold; said liquid mix comprising an organoammonium catalyst selected from organoammonium molybdates and tungstates, an alkoxyalkylaluminum halide cocatalyst or reactants needed to make said cocatalyst in situ, at least one monomer containing at least one norbornene group, and a sufficient amount of an impact modifier consisting essentially of a material selected from crystalline lower polyolefin powders, polyvinylidene fluoride powder and mixtures thereof to impart at least a doubling of impact strength when compared to the impact strength of the neat polymr of said monomer(s), measured by the notched Izod test.

2. Process of claim 1 wherein said polyolefin powder is selected from unsubstituted polyolefins of 2 to 3 carbon atoms in the repeating unit.

3. Process of claim 2 wherein said monomer is selected from the following monomers, and mixtures thereof:

where R and $R^1$ are independently selected from hydrogen, alkyl, and aryl groups of 1 to 20 carbon atoms, and saturated and unsaturated cyclic groups containing 3 to 12 carbon atoms formed by R and $R^1$ and the two ring carbon atoms connected thereto; amount of said catalyst being 0.01 to 50 millimoles molybdenum or tungsten per mol of monomer(s) and the molar ratio of said cocatalyst as aluminum to said catalyst as molybdenum or tungsten is in the range of about 200:1 to 1:10.

4. Process of claim 3 wherein said polyolefin is polyethylene having a particle size less than about one-half millimeter and amount of polyethylene being at least about 5 parts by weight per 100 parts by weight of said monomer or a mixture thereof.

5. Process of claim 4 wherein R and $R^1$ of said monomer are independently selected from hydrogen and alkyl groups of 1 to 2 carbon atoms; said liquid mix has a pot life of at least about one hour at room temperature and is polymerized in less than about 5 minutes after being thermally initiated; said catalyst is selected from catalysts defined by the following formulas I and II:

$$[R_4N]_{2y-6x}M_xO_y \qquad (I)$$

$$[R^1{}_3NH]_{2y-6x}M_xO_y \qquad (II)$$

where each R and $R^1$ group is independently selected from hydrogen, alkyl, and alkylene groups each containing 1 to 20 carbon atoms, and cycloaliphatic groups each containing 5 to 16 carbon atoms, the sum of all carbon atoms represented by said R groups is 20 to 72 and the sum of all carbon atoms represented by said $R^1$ groups is 15 to 54, M is selected from molybdenum (VI) and tungsten (VI), and x and y represent the number of M and O atoms in the molecule; and said cocatalyst is selected from those defined by the following formula:

$$(RO)_a R^1{}_b AlX_c$$

where R is an alkyl radical of about 1 to 18 carbon atoms, $R^1$ is an alkyl radical of about 1 to 12 carbon atoms, X is a halogen, "a" indicates equivalents of the alkoxy groups, RO— varying from about ½ to about 2½, "b" indicates the number of atoms of alkyl group $R^1$ varying from about ¼ to about 2, and "c" indicates the number of halogen atoms varying from about ½ to about 2.

6. Process of claim 5 wherein in the formula for said cocatalyst, "a" varies from about 1 to about 1¾, "b" varies from about ½ to about 1, and "c" varies from about ¾ to about 1¼; and amount of said polyolefin being up to about 20 parts.

7. Process of claim 6 wherein in the formula for said cocatalyst, R contains 2 to 4 carbon atoms, and $R^1$ contains 2 to 4 carbon atoms; wherein said monomer is selected from substituted and unsubstituted 2-norbornenes, dicyclopentadienes, dihydrodicyclopentadienes, trimers of cyclopentadienes, and tetracyclododecenes; and wherein said liquid mix has a pot life of about 1 to 8 hours and is polymerized in the mold at a temperature in the range of 60° to 200° C. in less than 5 minutes.

8. Process of claim 7 wherein said catalyst is selected from tridodecylammonium, tri(tridecyl) ammonium, and trioctylammonium molybdates and tungstates; and said impact modifier is crystalline polyethylene powder having particle size of one-quarter millimeter and less.

9. Impact modified polycycloolefin made by the process of claim 1.

10. Impact modified polycycloolefin made by the process of claim 8.

* * * * *